UNITED STATES PATENT OFFICE.

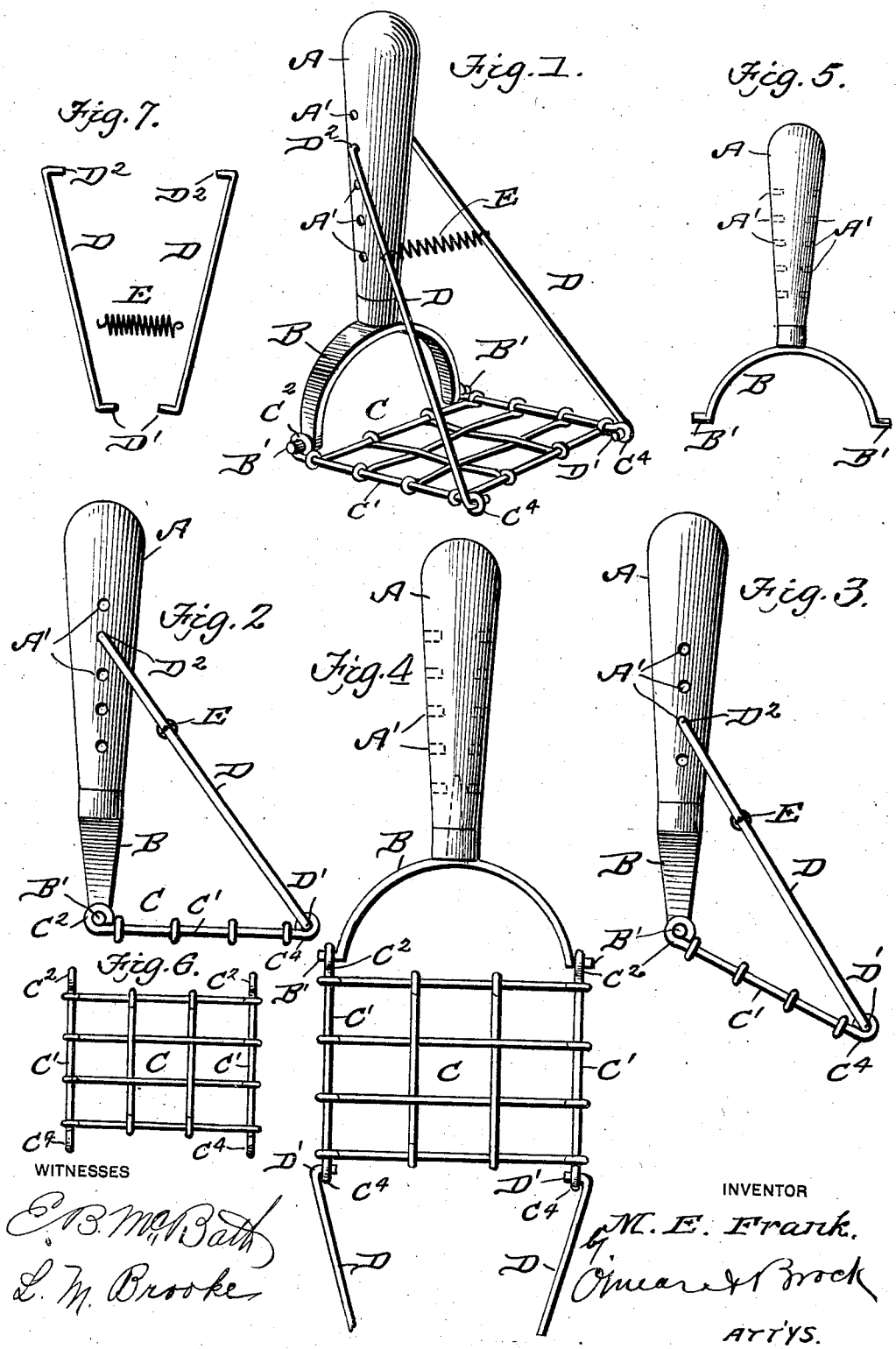

MILES E. FRANK, OF LARNED, KANSAS.

COMBINATION EGG-BEATER AND POTATO-MASHER.

No. 833,518.  Specification of Letters Patent.  Patented Oct. 16, 1906.

Application filed December 16, 1905. Serial No. 292,078.

*To all whom it may concern:*

Be it known that I, MILES E. FRANK, a citizen of the United States, residing at Larned, in the county of Pawnee and State of Kansas, have invented a new and useful Improvement in a Combination Egg-Beater and Potato-Masher, of which the following is a specification.

My invention relates to certain new and useful improvements in combined egg-beaters and potato-mashers, and has for its object to provide a device that is very simple and cheap in construction and one that can be used either as an egg-beater or potato-masher, as desired.

A further object of my invention is to provide a device which is so constructed that the frame can be adjusted to any angle desired, so as to form a potato-masher or an egg-beater.

A further object of the invention is to provide very simple adjusting means in connection with the frame, so that it can be easily and quickly adjusted.
A still further object of my invention is to provide a device that will be very handy around the kitchen, as it can be used for various purposes, such as removing eggs and potatoes out of boiling water.
With these objects in view the invention consists of the novel features of construction, combination, and arrangement of parts, hereinafter fully described, and pointed out in the claims.
In the drawings forming a part of this specification, Figure 1 is a perspective view of the device. Fig. 2 is a side view showing it adjusted so as to mash potatoes. Fig. 3 is a side view showing it adjusted so as to form an egg-beater. Fig. 4 is a front view of the device with the adjusting-arms detached from the handle, showing the frame and arms in a vertical position. Fig. 5 is a front view of the handle and bail. Fig. 6 is a plan view of the frame, and Fig. 7 is a detail view of the adjusting-arms.

Referring to the drawings, A indicates a wooden handle, which is preferably formed round, but may be of any shape desired. In opposite sides of the handle spaced recesses A' are formed for the purpose hereinafter described. A bail B is secured by an ordinary screw to the lower end of the handle and is provided with outwardly-extending lugs B' at each end adapted to pass through the eyes $C^2$ of the side bars C' of the frame C, which is provided with cross-bars forming a network. The other ends of the side bars C' are provided with eyes $C^4$, through which the inwardly-projecting ends D' of the arms D are adapted to pass. The other ends of the arms are provided with inwardly-projecting ends $D^2$, adapted to fit in the recesses A', formed in the handle, and to be readily locked therein by a coil-spring E, having its ends secured in openings formed in the arms D and having a tendency to pull the arms together, so that the arms can be pulled apart and adjusted to one of the recesses as desired.

From the foregoing description it will be seen that I have provided a very simple and useful device which can be readily adjusted so that it can be used for different purposes around the kitchen.

Having thus fully described my invention, what I claim as new, and desire to secure by Letters Patent, is—

1. In a device of the kind described, the combination of a handle, a skeleton framework pivoted at one side to one end thereof, and devices connecting the other side of the framework to the handle for holding said framework in different positions of angular adjustment with respect to the handle, for the purpose described.

2. In a device of the kind described, the combination with a handle having spaced recesses, of a skeleton frame pivoted to said handle and spring-actuated arms pivotally connected to said frame and adapted to engage the recesses in the handle, for the purpose described.

3. In a device of the kind described, the combination with a handle provided with a bail, of a frame pivotally mounted on said bail, arms pivoted to the side of said frame, and a spring connecting said arms adapted to hold the arms in engagement with the handle, for the purpose described.

4. In a device of the kind described, the combination with a handle provided with recesses, a bail connected to the lower end of said handle provided with outwardly-projecting lugs at its ends, a frame provided with network, hinged to said lugs, arms hinged to the outer end of the frame provided with inwardly-projecting ends, adapted to fit in said recesses, and a spring connecting said arms, for the purpose described.

5. In a device of the kind described, the combination with a handle provided with recesses, a bail secured to said handle provided with outwardly-projecting lugs, a frame provided with eyes adapted to fit over said lugs, eyes formed in the other ends of the frame, arms provided with inwardly-projecting members, at their ends fitting in said eyes, the other end of the arms adapted to fit in said recesses of the handle, and a spring connecting said arms, for the purpose described.

MILES E. FRANK.

Witnesses:
H. L. FRANK,
C. C. CASE.